United States Patent [19]
Bortel

[11] 3,799,473
[45] Mar. 26, 1974

[54] ROTARY WING AIRCRAFT AND DRIVE MEANS THEREFOR

[76] Inventor: Vance W. Bortel, 5011 N. 64th Dr., Glendale, Ariz. 85301

[22] Filed: Apr. 21, 1972

[21] Appl. No.: 246,245

[52] U.S. Cl. .............................. 244/17.19, 416/129
[51] Int. Cl. ............................................ B64c 27/14
[58] Field of Search............ 244/17.19, 17.21, 17.23, 244/17.11, 12 R, 6, 7 A, 51, 52; 74/788, 665 N; 416/121, 129, 128

[56] References Cited
UNITED STATES PATENTS

| | | | |
|---|---|---|---|
| 2,518,697 | 8/1950 | Lee | 244/17.19 |
| 1,191,501 | 7/1916 | Dees | 244/17.19 UX |
| 2,225,525 | 12/1940 | Pitcairn | 244/17.21 |
| 3,045,951 | 7/1962 | Freeland | 244/52 X |
| 2,969,937 | 1/1961 | Trojahn | 244/17.19 |
| 3,510,087 | 5/1970 | Strickland | 244/17.19 |

*Primary Examiner*—Milton Buchler
*Assistant Examiner*—Paul E. Sauberer
*Attorney, Agent, or Firm*—Warren F. B. Lindsley

[57] ABSTRACT

Drive means for rotary wing aircraft wherein the torque and counter-torque developed in the aircraft's power unit are utilized to drive the aircraft.

7 Claims, 4 Drawing Figures

PATENTED MAR 26 1974 3,799,473

ROTARY WING AIRCRAFT AND DRIVE MEANS THEREFOR

BACKGROUND OF THE INVENTION

The present invention relates to helicopters and the like which employ a rotary wing and more particularly to drive means for such aircraft which employs the torque and the counter-torque of the aircraft's power unit to provide the lift and lateral movement of the aircraft in flight.

DESCRIPTION OF THE PRIOR ART

Heretofore, rotary-wing aircraft have had to employ a so callled tail-rotor to overcome the counter-torque applied to the aircraft's body from the power unit used to drive the main rotor of the aircraft. This tail-rotor is one additional control the pilot must manage during flight and consumes some of the power developed by the aircraft's power unit. It also produces additional drag which impairs the movement of the aircraft. The mechanism for mounting and driving the tail-rotor adds weight to the aircarft and requires periodic maintenance.

SUMMARY OF THE INVENTION

In accordance with the invention claimed, a rotary wing aircraft drive means is disclosed which is designed to eliminate the need for a tail-rotor, its drive and control and the maintenance associated therewith. More particularly, a drive means is provided for rotary wing aircraft which utilizes both the torque and the counter-torque of the aircraft's power unit for lift and lateral movement in flight.

It is therefore one of the principal objects of the present invention to provide a drive means for rotary wing aircraft which will utilize the torque and counter-torque of the power unit in its normal operation.

Another object of this invention is to provide such a drive means which eliminates the need for a tail-rotor for counter-torque control, thereby reducing the overall drag of the aircraft in flight and eliminating this source of power consumption.

A further object of this invention is to provide such a drive means which will reduce the overall weight of the aircraft.

A still further object of this invention is to provide such a drive means which is more efficient and economical to operate than the drive means of conventional rotary wing aircraft.

A still further object of this invention is to provide a rotary wing aircraft with an improved drive means having fewer parts and thereby less expensive to manufacture, operate, and maintain than conventional helicopters.

A still further object of this invention is to provide such an aircraft which is lighter in weight than conventional aircraft.

A more specific object of this invention is to provide a rotary wing aircraft with a drive means wherein no counter-torque is applied to the airframe itself and thereby the aircraft will be much easier to fly.

Another specific object of this invention is to provide a drive means for rotary wing aircraft wherein the counter-torque of the power unit is employed to drive a fan which develops a high speed airflow which is controlled and utilized for aiding the lift and lateral movement of the aircraft.

A further specific object of this invention is to provide such a torque and counter-torque drive utilization wherein the rotor operates in one direction from the power unit and the fan rotates in the opposite direction.

A still further specific object of this invention is to utilize a conventional rotor assembly and speed governor therefor in combination with the disclosed drive means installed in such a manner that the output of the power unit and the speed of the control fan of the invention are automatically controlled in response to the pitch attitude of the rotor blades of the aircraft.

Yet another object of this invention is to provide a drive means which may utilize any suitable power unit, such as, for example, a gas, hydraulic, air, steam, or any other suitable source of power.

These and other objects and advantages of this invention will become more apparent as the description proceeds, and the features of novelty which characterize the invention will be pointed out with particularity in the claims annexed to and forming part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
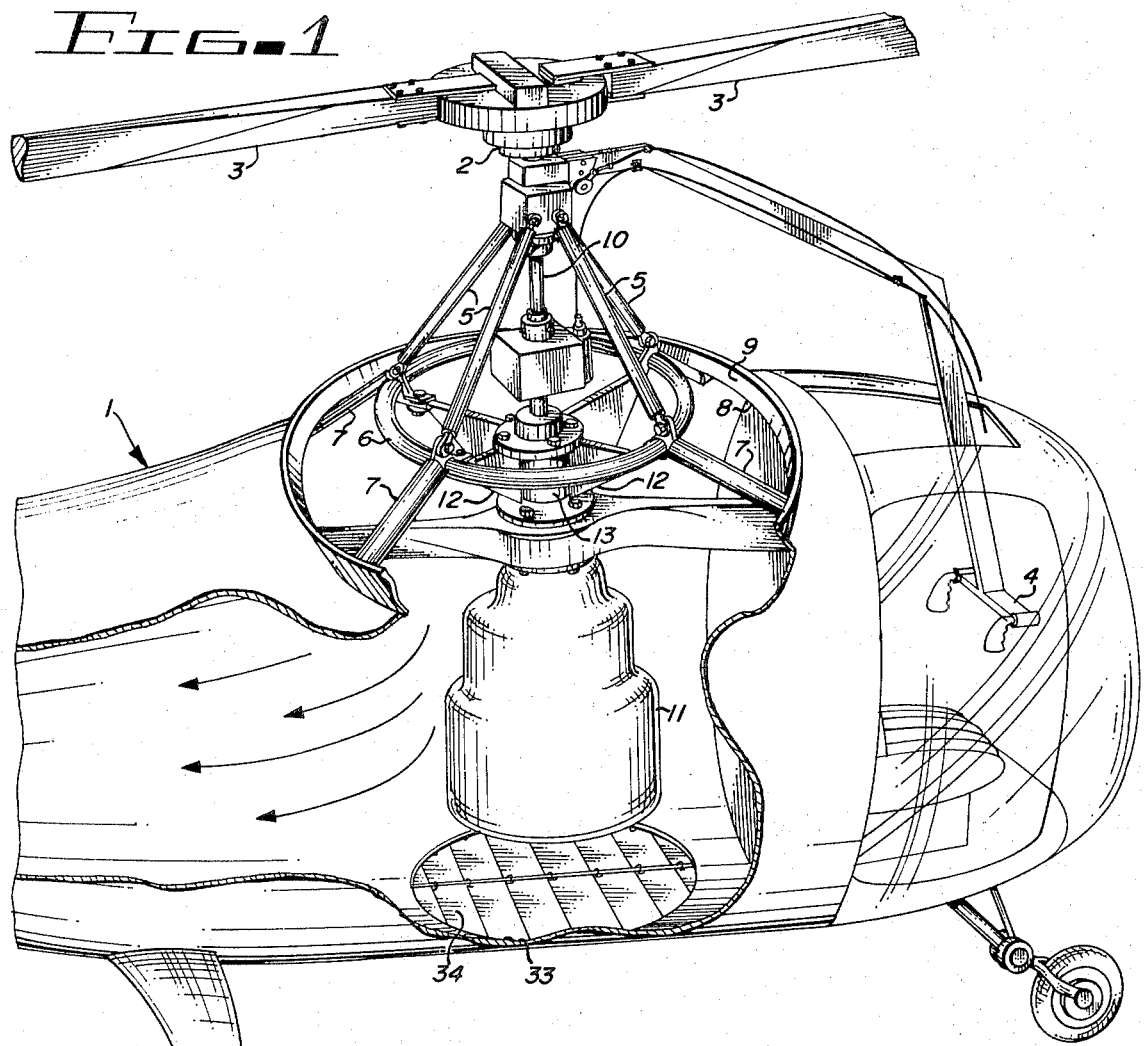
FIG. 1 is a fragmental perspective view, with parts broken away, of a rotary wing aircraft embodying the invention.

Referring more particularly to the drawing by characters of reference, FIGS. 1–4 illustrate a rotary wing aircraft 1 embodying the invention wherein the aircraft is shown with a conventional rotor assembly 2 employing rotor blades 3—3 on which the pitch and altitude may be varied by the pilot using controls 4 in the conventional manner. The rotor assembly is mounted on the fuselage of aircraft 1 by a suitable support which includes brackets 5—5 attached to the rotor assembly 2 at one end and to a mounting ring 6 at their opposite ends. The mounting ring 6 being connected to the fuselage or body by additional brackets or supports 7—7, as shown, define a substantially circular opening 8 in the upper portion of the fuselage. A cowling or fairing 9 is provided around the edge of opening 8.

The rotor drive shaft 10 is connected at one end to the rotor assembly 2 to drive blades 3 and at its opposite end extends downwardly through opening 8 into the body of the fuselage where it is arranged in a driven connection with the outer body of a power unit 11.

A plurality of vane-like supports 12—12 are carried by the mounting ring 6 to provide support for the bearing housing 13 through which the rotor drive shaft extends. Suitable bearings 14—14 are arranged in the bearing housing to rotatably support and guide drive shaft 10.

The power unit 11 may be of any suitable type, that is, a gas engine, hydraulic motor, air motor, steam engine, transmission device, or the like, and may be self contained, as with a gas engine, or driven from a separate suitable power source, not shown, mounted in the body of the aircraft.

The power unit has an external housing or body 15 which is drivingly connected to the rotor drive shaft 10 by means of a flange or plate member 16 secured axially of body 15 by means of bolts 17—17, the flange or plate member 16 having a splined axial opening to receive the correspondingly splined end 18 of the rotor drive shaft 10. It will be noted that rotor blades 3—3 and body 15 of power unit 11 rotate together at the same speed because of their direct connection to each other.

Figure 4:
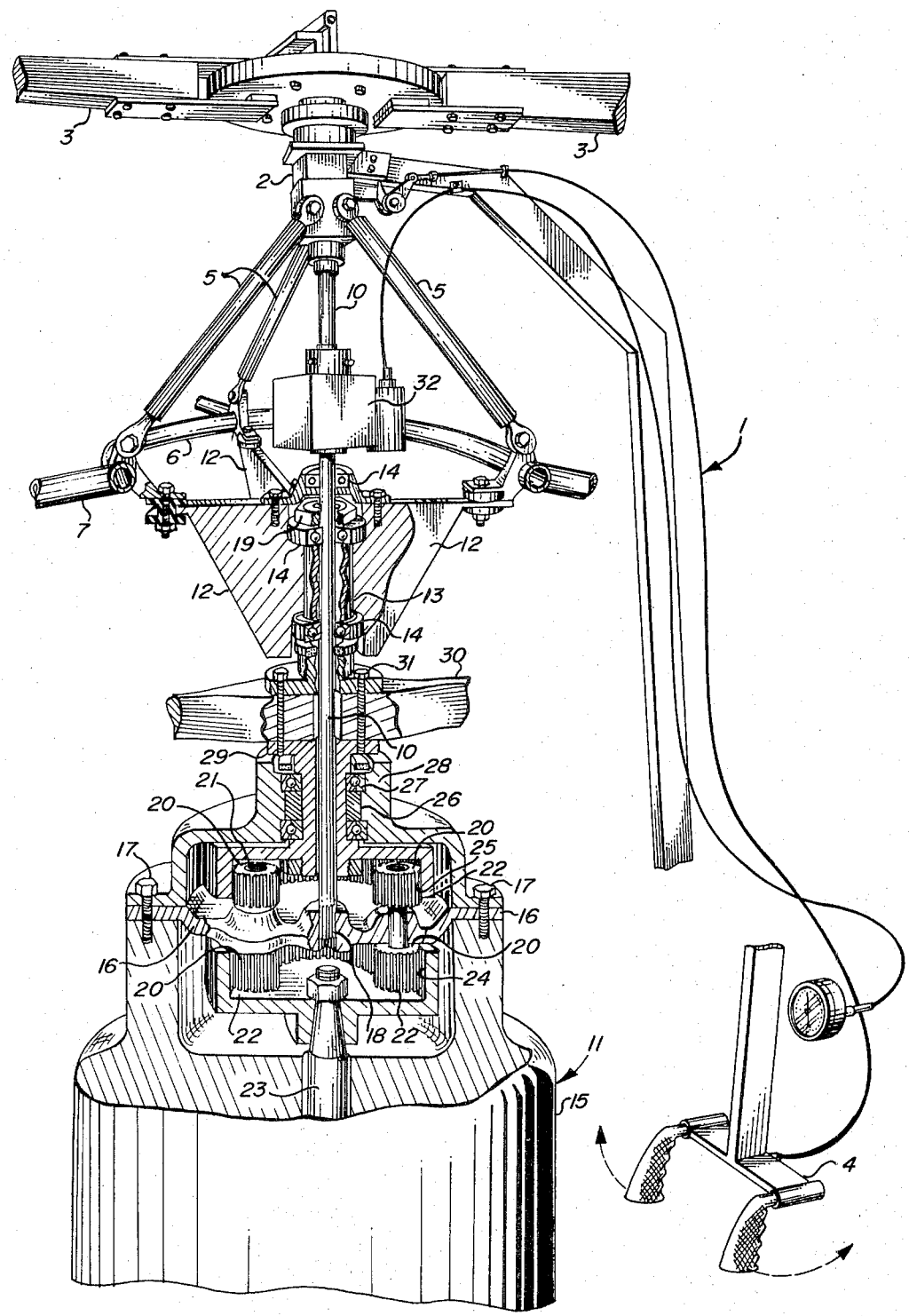
FIG. 4 is a fragmental perspective view, with parts broken away, of an aircraft drive means embodying the invention.

As shown in FIG. 4, a nut or similar connector 19, on drive shaft 10 bearing against one of the bearings 14 serves as a support to suspend the power unit from the power unit support bearing housing 13 connected to mounting ring 6.

The flange or plate member 16 shown in FIG. 4 carries a plurality of transfer gears 20—20 having a central shaft 21 journaled in plate 16, each shaft having a matched gear 22—22 on each end thereof. The power unit drive shaft 23 has an internal gear 24 secured thereto to mesh with the transfer gears 22 on the under side of the flange or plate 16 in driving relationship therewith.

On the upper side of plate 16, a similar internal gear 25 is carried to drivingly engage the upper ones of the transfer gears 22—22. Internal gear 25 has a hub or stub shaft 26 which is carried co-axially of the drive shaft 10 to rotate separately therefrom, the hub or stub shaft 26 having suitable bearings 27—27 carried in the bell housing like end 28 of the power unit 11, so that the hub 26 may rotate independently of the housing and drive shaft 10, which latter parts, as stated above, rotate together.

The hub or stub shaft 26 extends through the end 28 of the power unit body 15 to provide a mount 29 to receive the fan 30 which is secured thereto by means of bolts 31—31, as shown, which fan will be rotated by the power unit drive shaft in the opposite direction to, and much faster than, the rotation of rotor power unit because of a balance of torque between the rotor blades and the fan 30.

Even though gears are shown as interconnecting means for driving the rotor blades and the fan, other interconnecting means may be used such as mechanical or electrical connections.

The fan 30 has a predetermined diameter and pitch to cooperate with the rotor power unit rotation load during operation of the aircraft, as will become apparent, and is located within the aircraft body adjacent to opening 8 and cowling or fairing 9.

As is conventional with rotary wing aircraft, a governor 32 is provided to maintain the speed of the rotor blades 3—3 at a predetermined speed. Suitable mechanism, not shown, is provided so that if the blades slow down slightly the governor calls for more speed to be applied to the blades, and this automatically activates the power unit 11 to provide more power so that the blades 3—3 may be brought up to and maintained at the desired speed. This may be accomplished, for example, in a gas engine by supplying more gas to the engine. Similarly, if the rotor blades 3—3 should be going too fast, the governor will call for less speed for the blades and will automatically activate the power unit to supply less power so that the blades may slow down. For example, less gas would then be supplied to the gas engine. Thus, the rotor blades are maintained at a constant speed during operation.

It is deemed apparent that by increasing the pitch of rotor blades 3—3 by means of pilot controls 4 causes the rotation of blades 3—3 to slow down which in turn cause the governor to activate the power unit to supply more power to bring the blades back up to desired speed.

It is also deemed apparent that if the pitch of the blades 3—3 is reduced, the blades would speed up causing the governor to activate the power unit to supply less power to the blades which cause the rotation of the blades to slow down to their desired operating speed.

Operation

In operation with the power unit operating the body 15 of the power unit 11 will rotate with and at the same speed as rotor blades 3—3. With the rotor blades at neutral pitch, the power unit will operate at idle speed, driving the power unit body and the blades 3—3 at this speed. Fan 30 will be rotating from the power unit drive shaft 23 and associated transfer gears 22-24-25 in the opposite direction from and faster than the blades 3—3 and body 15 due to the counter torque developed by the power unit in driving blades 3—3.

From the above, it is deemed apparent that in flying an aircraft equipped with my invention, the pilot would apply increased collective pitch to the rotor blades 3—3 through controls 4 and this would cause the blades 3—3 and body 15 of the power unit 11 to slow down slightly, at which time the governor would call for more power output or torque which would result in bringing the rotor blades and body 15 up to the desired speed. This action would provide sufficient torque to the rotor to lift the craft off the ground and the counter torque from the power unit would be applied to fan 30 through the gears 22-24-25, causing the fan to be speeded up also in direct relationship to the additional power or torque supplied to the rotor.

The fan 30 has a predetermined pitch and diameter as stated above to cooperate in balancing the torque of the rotor so that no torque is applied to the body of aircraft 1.

Figure 3:
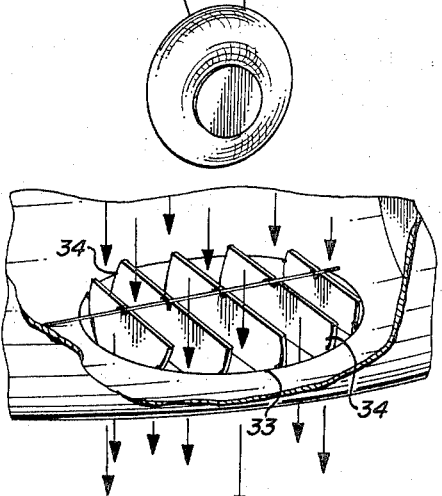
FIG. 3 is a fragmental perspective view of the lower fuselage of an aircraft showing the louvers which permit fast flowing air to be directed downwardly to aid in the lift effect of the aircraft power plant and which may be closed to direct the air through the tail section of the aircraft.
Figure 2:
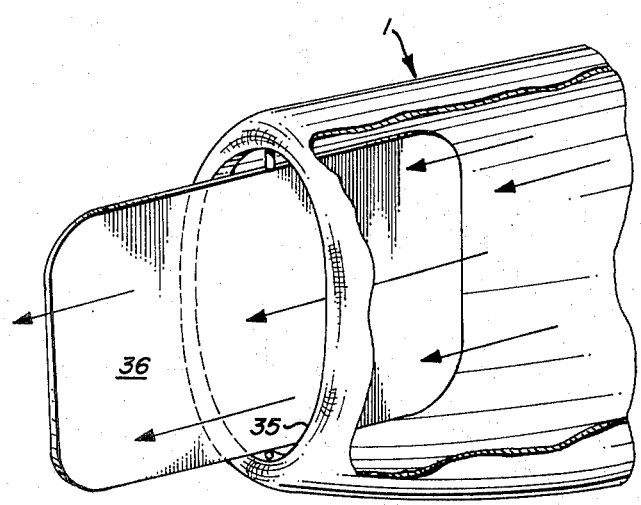
FIG. 2 is a fragmental perspective view, with parts broken away, of the tail section of the aircraft shown in FIG. 1.

Fan 30 generates a stream of fast moving air which is drawn into the body of aircraft 1 through opening 8. This stream of fast moving air may be directed downwardly through opening 33 in the bottom of the body of the aircraft directly below fan 30, as shown in FIGS. 1 and 3, to assist in the lifting of the aircraft from the ground. Opening 33 has louvers 34—34 to permit its closing after the desired operating altitude is reached. With the louvers closed, the fast moving air stream is directed through the body of aircraft 1 and out through an opening 35 at the rear of the aircraft body. Obviously this fast moving stream of air coming through opening 35 will aid the forward movement of the aircraft in flight. The body of the aircraft thus acts as a duct for the air stream. A rudder 36 may be provided to assist in steering the aircraft if desired, or the conventional steering control using the rotor assembly may be used.

It is deemed apparent that the aircraft equiped with my invention may be flown in the same manner as conventional rotary wing aircraft except that control will be simpler when no tail rotor is needed. Also, all available power from the power unit is utilized in the flight of the aircraft and none is wasted in driving a tail rotor. Both the torque and counter torque of the power unit are employed in my invention making for more economical and efficient operation of the aircraft.

It will be apparent to those skilled in the art that changes and modifications may be made to the apparatus shown and described herein without departing from the scope of the appended claims.

What is claimed is:

1. Drive means for a rotary wing aircraft having an aircraft body, a rotor assembly mount on said sircraft body including a plurality of rotor blades, an upper opening through said aircraft body in axial relationship to said rotor assembly, and a rear opening through said aircraft body, said drive means comprising:
   a power member suspended from said aircraft body and having a housing and a drive shaft rotatably mounted in said housing,
   a rotor drive shaft connected at one end to said rotor blades of the aircraft and at the opposite end to said housing so that said rotor blades and said housing rotate together,
   a fan rotatably mounted co-axially of said rotor drive shaft and said upper opening in the aircraft body, and
   means connecting said fan to said power member drive shaft to rotate therewith in a direction opposite to and faster than the rotation of said rotor blades and said housing due to a balancing of torque between said rotor blades and said fan to generate a fast moving stream of air which is expelled from said rear opening in said aircraft body to assist in forward movement of the aircraft in flight.

2. The drive means set forth in claim 1 wherein said power member comprises a motor whose housing and drive shaft are co-axially arranged for individual rotation.

3. The drive means as set forth in claim 2 in further combination with a steering rudder mounted in said rear opening in the aircraft to aid in directional control of the aircraft.

4. The structure as set forth in claim 2 wherein said aircraft body is provided with an opening through the underside thereof below said fan,
   a plurality of louvers mounted in said opening in the underside of said aircraft body,
   and means for opening said louvers to permit the discharge of air therethrough during takeoffs and for closing said louvers during normal flight.

5. A rotary wing aircraft comprising a body,
   a rotor assembly including a plurality of blades carried on and above said body,
   a power unit comprising a motor having a co-axially arranged rotatably mounted housing and drive shaft suspended from said body,
   a rotor drive shaft connected at one end to said rotor blades and at the opposite end axially of said housing of said power unit so that said rotor blades and housing will rotate together,
   a fan mounted within said aircraft body axially of said rotor drive shaft,
   a plurality of gears connecting said fan to said drive shaft of said power unit to rotate therewith in a direction opposite to and at a faster speed than the rotation of said blades and said housing of said power unit due to a balancing of torque between said rotor blades and said fan,
   an air intake opening arranged in said aircraft body above said fan and an air discharge opening at the rear thereof, said intake opening and said discharge opening forming passageways through which air generated by said fan is drawn and discharged respectively to assist in forward movement of said aircraft.

6. The aircraft set forth in claim 5 in further combination with:
   an opening provided in the underside of said body below said fan,
   a plurality of louvers arranged in said opening for controlling the movement of air therethrough,
   and means for opening said louvers to permit the discharge of air therethrough during takeoffs and for closing said louvers during normal flight.

7. The structure as set forth in claim 5 in further combination with:
   a governor to maintain said blades at a predetermined constant speed,
   pitch control means to increase and decrease the pitch of said blades,
   and means connected with said governor to control the output of said power unit in accordance with the pitch attitude of said blades.

* * * * *